(No Model.)

A. H. HOYT.
GALVANOMETER.

No. 497,448. Patented May 16, 1893.

Witnesses
Jas. J. Maloney
A. J. Locke

Inventor
Adrian H. Hoyt
by Jno. P. Livermore
Att'y

UNITED STATES PATENT OFFICE.

ADRIAN H. HOYT, OF MANCHESTER, NEW HAMPSHIRE, ASSIGNOR TO THE WHITNEY ELECTRICAL INSTRUMENT COMPANY, OF SAME PLACE.

GALVANOMETER.

SPECIFICATION forming part of Letters Patent No. 497,448, dated May 16, 1893.

Application filed May 9, 1892. Serial No. 432,306. (No model.)

*To all whom it may concern:*

Be it known that I, ADRIAN H. HOYT, of Manchester, county of Hillsborough, State of New Hampshire, have invented an Improvement in Galvanometers, of which the following description, in connection with the accompanying drawings, is a specification, like letters on the drawings representing like parts.

My invention relates to a galvanometer or instrument for indicating the strength of an electric current.

The instrument comprises a permanent field magnet and a needle or armature having a pivotal movement in the field thereof, provided with a pointer to indicate in connection with a suitable scale the amount of its movement, the said instrument also having a coil through which the current to be measured passes, which coil is located in such position with reference to the needle as to cause the current therein to tend to move the said needle from the position occupied while under the directive influence of the magnet the amount of this movement thus indicating the strength of the current by which it is produced. In order to control or regulate the relative effect of the current and of the field magnet on the needle, the said solenoid is in accordance with this invention provided with a core and means to adjust its position in said coil to thereby vary the effect produced on the needle by the current passing through the coil.

Another feature of the invention consists in making the end of the said core diagonal to the axis of the solenoid or in other words, making the said core of such shape that the part at one side of the axis of the needle approaches nearer the needle, when in its normal position, than the part at the other side, the effect of such disposition of the material being to increase its influence upon the needle as the latter departs from its normal position, thus making the increments of movement of the needle more nearly in direct proportion to the increments of current than is usually the case.

Figure 1:
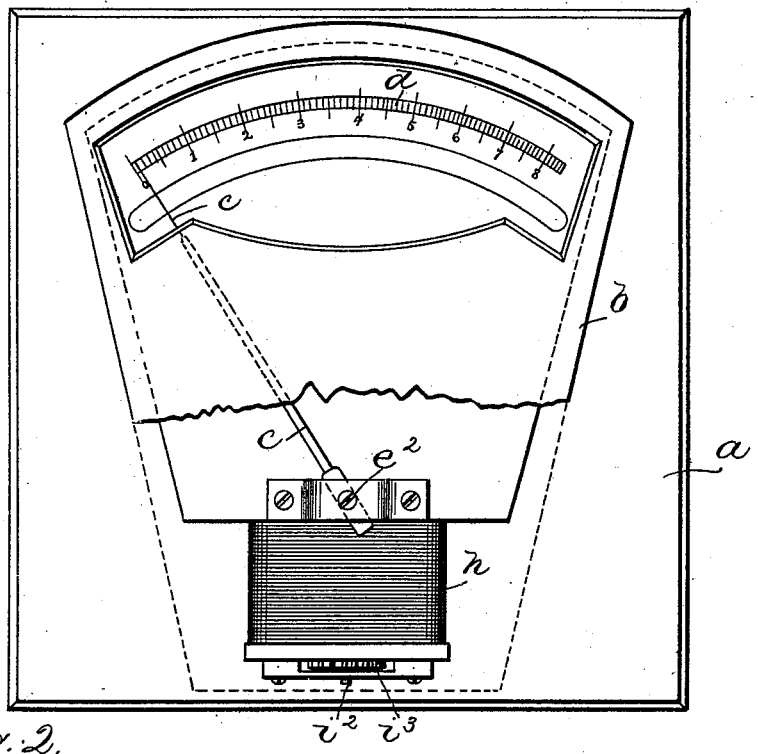
Figure 2:
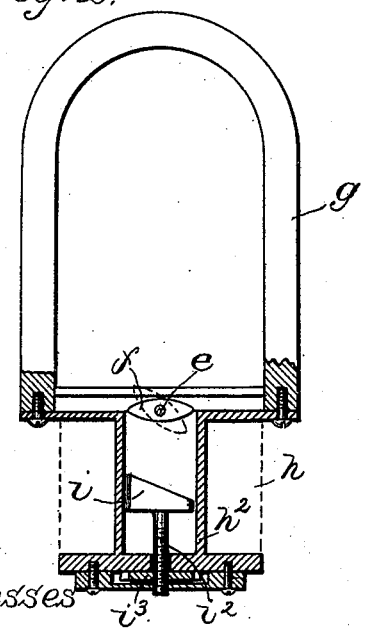

Figure 1 is a plan view of a galvanometer embodying this invention; Fig. 2 a sectional plan through the axis of the solenoid, and Fig. 3 an end elevation of the solenoid and device for adjusting the core thereof.

The operative parts of the instrument are supported on the base plate $a$ and inclosed in a cover $b$ a portion only of which is shown in Fig. 1, said cover having an opening through which the end of the indicating pointer $c$ and the graduated scale $d$ with which it co-operates may be observed. The said pointer $c$ is connected with an arbor $e$ pivoted at $e^2$ see Fig. 1, and having fixed upon it an armature or needle $f$ see Fig. 2, which is subjected to the attractive influence of a field magnet $g$ shown as of the horse-shoe or U-shape, the said needle $f$ normally standing lengthwise between the poles of the said magnet as shown in full lines Fig. 2. The current to be measured is caused to pass through a coil $h$ one end of which is about in line with the poles of the magnet $g$ as shown. The said coil $h$ is wound upon a flat tube $h^2$ of non-magnetic material the open end of which tube is adjacent to the needle $f$ which may thus turn from its normal position transverse to the axis of the solenoid as shown in full lines Fig. 2, toward the position in line with the said axis as indicated by dotted lines Fig. 2, the amount of its angular movement depending upon the amount of attractive movement of the solenoid relative to the attractive force of the field magnet, and varying with the strength of the current passed through the said coil.

In order to increase the effect of the current in the coil on the needle $f$ the said coil is provided with a core piece $i$ of iron which becomes magnetized by the current traversing the coil and thus acts upon the needle $f$ in conjunction with the direct inductive action of the current in the coil. The said core piece is shown as approaching the needle more at one side than at the other side of the axis of the said needle (when in normal position) the result of which is that when the needle is turned from the normal full line position toward the dotted line position, the effect of the attraction of the core to turn the needle is greater than it would be if the core were square across the axis of the solenoid or approached the needle equal on both sides of the axis of the latter. The result of this construction of the core is to give a more uniformly graduated scale $d$ than is commonly attained, because the effective action of the directive influence to resist the movement of the needle increases as the needle departs from its normal position, while the effect of the current in the solenoid to produce such movement diminishes as the needle moves farther from its normal position, so that commonly a given increment in the current produces far smaller movements of the needle when it is already at some distance from its original or normal position, than is produced by an equal increment in current when the needle is at the beginning of its movement from the normal position, so that the gradations at the higher numbers on the scale are usually much smaller than those at the lower numbers on the scale, a defect that is to a large extent corrected by the construction of the solenoid core herein shown and described.

Figure 3:
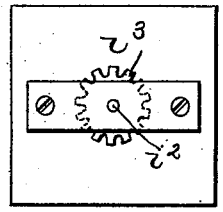

The relative effect of the current and magnetic field upon the needle may be varied by changing the position of the core $i$ in the coil, movement of said core toward the needle $f$ increasing the current effect and movement in the opposite direction diminishing the current effect; and in order to facilitate the adjustment of the core and consequent control of the relative effect of the current and field upon the needle, the said core is as shown in this instance provided with a threaded shank or stem $i^2$ engaged by a nut $i^3$ which is restrained from longitudinal movement in the direction of the axis of the solenoid so that the rotation of said nut in one or the other direction produces a longitudinal movement of the shank $i^2$ and core $i$ in the axis of the solenoid. The said nut is provided with a notched or milled periphery as best shown in Fig. 3, to facilitate its rotation for the purpose of adjusting the position of the core $i$.

The invention is not limited to the specific construction and arrangement shown, as it is obvious that these may be varied without departing from the essential novel features of the invention.

The invention, so far as relates to the adjustability of the core and means for effecting the same, is not confined to a core having the construction described for producing uniformity of movement of the needle, and on the other hand the invention so far as relates to the construction for producing uniformity of movement of the needle is not limited to a core which is also adjustable in the solenoid.

The devices herein shown act mainly to modify the effect produced by the current on the needle, and the field magnet for producing the directive influence is not herein shown as having any means for adjusting its effect upon the needle, but it is obvious that the devices herein shown and described for varying the effect of the current are equally applicable in instruments in which means are also provided for adjusting the effect of the field magnet.

I claim—

1. The combination of the field magnet and needle pivotally supported in the field thereof, with a solenoid and core cooperating with said needle, substantially as and for the purpose described.

2. The combination of a field magnet and needle movable in the field thereof, with a solenoid and movable core piece therein, and means to adjust the said core piece relative to said needle, substantially as and for the purpose described.

3. The combination of the field magnet and needle pivotally supported in the field thereof, with a solenoid and core therein of greater extent toward the needle at one side than at the other side of the axis thereof, substantially as and for the purpose set forth.

In testimony whereof I have signed my name to this specification in the presence of two subscribing witnesses.

ADRIAN H. HOYT.

Witnesses:
JOS. P. LIVERMORE,
JAS. J. MALONEY.